United States Patent [19]

Warren

[11] Patent Number: 4,583,130
[45] Date of Patent: Apr. 15, 1986

[54] AST FOR A TWO TRACK VTR

[75] Inventor: Henry R. Warren, Belle Mead, N.J.

[73] Assignee: RCA Corporation, Princeton, N.J.

[21] Appl. No.: 475,621

[22] Filed: Mar. 15, 1983

[51] Int. Cl.⁴ .............................................. H04N 5/782
[52] U.S. Cl. ................................... 358/327; 360/10.2; 369/43; 369/50
[58] Field of Search ............... 360/DIG. 1, 10.2, 10.3, 360/22, 77; 358/310, 327; 369/43, 47, 50

[56] References Cited

U.S. PATENT DOCUMENTS

| | | | |
|---|---|---|---|
| 4,141,048 | 2/1979 | Kubota et al. | 360/77 |
| 4,321,621 | 3/1982 | Kinjo et al. | 360/77 X |
| 4,322,836 | 3/1982 | Kinjo et al. | 369/43 |
| 4,439,799 | 3/1984 | Haubrich et al. | 360/77 |
| 4,445,144 | 4/1984 | Giddings | 360/77 X |

Primary Examiner—Robert L. Richardson
Attorney, Agent, or Firm—Eugene M. Whitacre; Paul J. Rasmussen; Joseph J. Laks

[57] ABSTRACT

A magnetic tape has luminance and chroma components recorded in different tracks with the horizontal sync signal recorded between them. On playback, if there is mistracking, the sync signal will be present in either the luminance or the chroma signal. This is detected and used to control the deflection of a bimorph to correct the mistracking.

7 Claims, 2 Drawing Figures

AST FOR A TWO TRACK VTR

BACKGROUND OF THE INVENTION

The present invention relates to AST (automatic scan tracking) for a VTR (video tape recorder), and more particularly for such a VTR in which at least two tracks are simultaneously reproduced.

In helical scan VTRs a magnetic tape having recorded tracks is displaced around a drum. Within the drum is a headwheel containing magnetic reproducing heads. The reproducing heads must "track" (stay aligned with) the recorded tracks in order to obtain sufficient amplitude for proper reproduction of the recorded signal. However without some kind of tracking system, tracking errors occur.

A prior art method for controlling tracking errors has the reproducing heads mounted on a bimorph, which in turn is attached to the headwheel, and an oscillating "dither" signal applied to the bimorph to "dither" the heads. If a tracking error occurs, phase and amplitude changes in the reproduced signal are produced, which changes can be detected to provide information as to the direction and magnitude of the error. From this information a tracking control signal is generated and applied to the bimorph to ensure tracking. However, the dither signal may be in the range of the mechanical resonance frequency of the heads and associated mountings, which may cause uncontrolled head vibrations, thereby making controlled tracking difficult. An additional disadvantage of the dither technique is that in the normal tracking mode, the playback head at least partially leaves the recorded track, thereby periodically reducing the carrier signal level and decreasing the carrier-to-noise ratio.

Another AST technique is shown in U.S. Patent Application Ser. No. 416,542, filed Sept. 10, 1982, in the name of K. J. Hamalainen, now U.S. Pat. No. 4,525,750, and assigned to the assignee of the present invention. As disclosed therein, the reproducing heads have a width slightly smaller than the track width. The signals from the reproducing heads are amplitude compared. When mistracking occurs, the amplitudes will differ, thereby providing an error signal to control the bimorph to maintain tracking. This system eliminates head resonance problems; however since the reproducing heads are narrower than the track widths, a reduction in carrier-to-noise ratio still occurs.

It is therefore desirable to provide an AST system that does not cause resonance and maintains the carrier-to-noise ratio.

SUMMARY OF THE INVENTION

Method and apparatus comprising simultaneously reproducing information signals from a plurality of information tracks having at least one tracking signal track at least partially disposed between said information tracks, detecting said tracking signal in at least two reproduced information signals, and correcting the tracking using the detected tracking signals.

DETAILED DESCRIPTION

Figure 1:
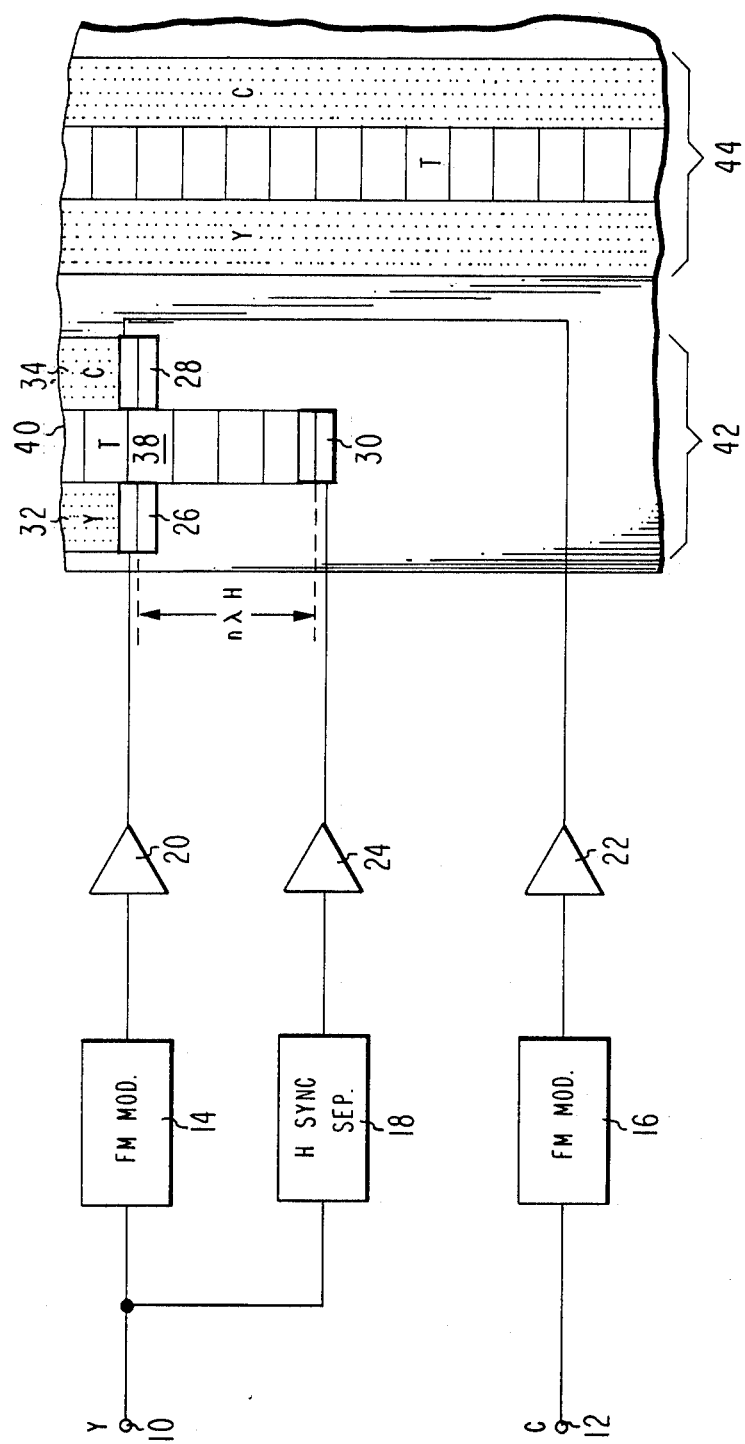
FIG. 1 is a block diagram of a recording system in accordance with the invention.

In the recording system of FIG. 1, luminance (Y) and chroma (C) component signals of a color video signal are received at input terminals 10 and 12 respectively and applied to FM modulators 14 and 16 respectively. In addition the Y signal is applied to horizontal sync separator 18. Modulators 14 and 16 can have a carrier frequency of, e.g., 6 MHz and a deviation of 1 MHz. The modulated signals from modulators 14 and 16 are applied to recording amplifiers 20 and 22 respectively, while the sync signal from separator 18 is applied to recording amplifier 24. The thus amplified signals from amplifiers 20, 22, and 24 are respectively applied to recording heads 26, 28, and 30 to respectively record Y signal track 32, C signal track 34 and tracking (T) signal track 38 on tape 40. If recording heads 26 and 28 are also used for playback, head set 26, 28, 30, or just heads 26 and 28 may be mounted in known manner on a bimorph, which bimorph is not energized during recording.

This recording is achieved by having tape 40 describe a helical path about a rotating drum (not shown) and mounting heads 26, 28, and 30 within the drum, all as known in the art. Since it is difficult to mount head 30 between heads 26 and 28, it is forwardly displaced therefrom on the drum. In particular, its gap is displaced from the gaps of heads 26 and 28 by a distance of $n\lambda_H$, wherein n is a positive integer other than zero, and $\lambda_H$ is the recorded wavelength of the horizontal frequency $f_H$ on tape 40. Since head velocity errors and tape stretch can cause timing errors between the tracking and the Y and C signals, n should be small. Further, $\lambda_H = V/f_H$, wherein V = scanning velocity. The selected spacing ensures that upon playback any intermodulation products between the tracking horizontal sync signal and the Y or C signals occur during the horizontal blanking portions, when they are not visible.

The resulting tape format has a track set 42 having a tracking track 38 completely extending between information tracks 32 and 34, one similar set 44 of previously recorded tracks is shown. It is noted that no tracking track is disposed between sets 42 and 44. Although not shown in FIG. 1, all tracks have an angle of 2 degrees 34 minutes with respect to the edge of 40 if SMPTE type-C format is used.

Figure 2:
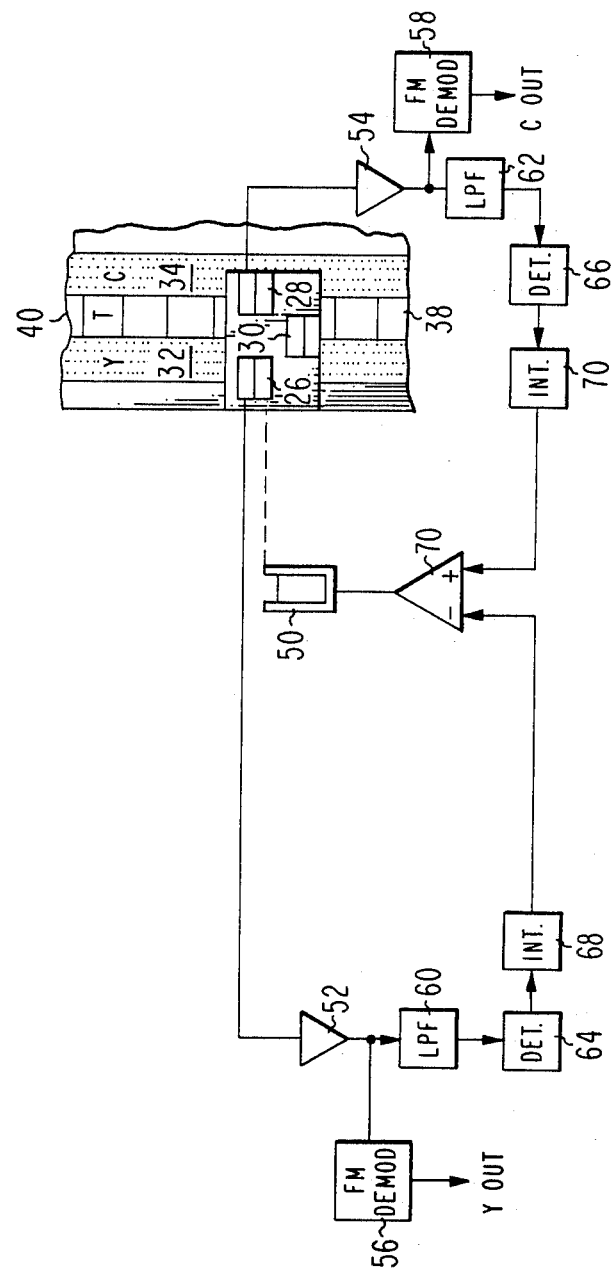
FIG. 2 shows a block diagram of a reproducing system in accordance with the invention.

The reproducing system is shown in FIG. 2. Tape 40 is again helically displaced around a drum (not shown). Tracks 32 and 34 induce signals in heads 26 and 28 respectively, which heads are now used for playback and are mounted at the end of bimorph 50 as symbolically indicated by the dotted line. It will be noted that heads 26 and 28 are shown displaced to the left with respect to tracks 32 and 34, i.e., there is mistracking. Thus head 28 will pick up some of the tracking horizontal pulse signal in track 38, while head 26 does not pick up the tracking signal. Since the heads operate on the rate of change of flux, they cause a differentiation of the tracking pulse; therefore the result is a DC level shift in the C signal provided by head 28 at the pulse edges of the tracking pulse. Since the leading and trailing pulse edges of any given pulse go in opposite directions, the resulting DC level shifts will be in opposite directions. Tracking head 30 is unused during reproduction.

The signals from heads 26 and 28 are respectively applied to amplifiers 52 and 54. The output signals from amplifiers 52 and 54 are respectively applied to FM demodulators 56 and 58 and to LPFs (low pass filters)

60 and 62. The output signals from demodulators 56 and 58 respectively comprise baseband Y and C signals and are further processed for display as known in the art.

LPFs 60 and 62 can have a cutoff frequency of about 200 kHz since the tracking signal is the 15.73425 kHz horizontal sync signal. For other tracking signals, appropriate cutoff frequencies are appropriately chosen. As explained above, during the mistracking illustrated in FIG. 2 head 28 is providing a tracking signal while head 26 is not. Thus LPF 62 provides an output signal, while LPF 60 does not. The output signal from LPF 62 is applied to detector 66, which can comprise a full wave rectifier so as to rectify DC level shifts going both positively and negatively. The rectified output signal from detector 66 is applied to integrator 70, that produces a smooth DC output signal, which output signal is applied to the non-inverting input of difference amplifier 70. The inverting input terminal of amplifier 70 receives no signal for the mistracking condition shown in FIG. 2. The output signal of amplifier 70 is applied to bimorph 50 with such a polarity so as to cause it to bend to the right as viewed in FIG. 2 by a sufficient amount to cause head 28 to no longer provide a tracking signal or for the tracking signals to be equal. Therefore proper tracking is obtained in a degenerative feedback manner.

It will be readily seen that if a right direction mistracking occurs, head 26 will provide a tracking signal, which will be filtered by LPF 60, full wave rectified by detector 64, integrated by integrator 68 and then applied to the inverting input of amplifier 70. This will cause a leftward bending action of bimorph 50 to achieve proper tracking.

It will be appreciated that many other embodiments are possible within the spirit and scope of the invention. For example, more than two information tracks may be simultaneously reproduced. The tracking signal need not comprise the horizontal sync signal and can extend beyond the horizontal blanking period. Further, the tracking signal track can partially overlap the information signal track. Also, comparator 70 can be eliminated and the integrated signals applied to electrodes on opposite sides of bimorph 50. Still further the luminance and/or chrominance signals can be digital signals. While it is advantageous for the T recording head to precede the Y and C recording heads so that the T signal does not overwrite the Y and C signals, nevertheless the T recording head may follow and Y and C heads. If crosstalk is tolerable, the tracking signal may occur adjacent the information signals, as for example by use of a frequency-divided subcarrier signals as the tracking signals, if the frequency of the tracking signal is outside the passband of the chroma and luminance demodulators. The width of the T track may be less than the width of the information tracks, and the information tracks themselves may be of different widths commensurate with signal-to-noise requirements. Also, the width of the T recording head may be wider than the space between the Y and C heads. The FM carriers present at the Y and C heads, which heads follow the T head during recording, reduce by erasure the width of the T-track to exactly the spacing between the Y and C tracks. This reduces accuracy requirements of both the width and lateral position of the T-head.

What is claimed is:

1. Apparatus for use with a record having information signals comprising luminance and chroma components of a television signal in two respective information tracks, and at least one tracking signal track at least partially disposed between said information tracks, wherein said tracking signal comprises a synchronization signal related to a horizontal synchronization signal, said apparatus comprising reproducing means for reproducing said information signals, detecting means for detecting said tracking signal in one of the two reproduced information signals, and correcting means for correcting the tracking using the detected tracking signal.

2. Apparatus as claimed in claim 1, further comprising said record, said record comprising a magnetic tape.

3. Apparatus as claimed in claim 1, wherein detecting means comprises a pair of channels, each channel including a filter coupled to said reproducing means for providing only said tracking signal, a detector coupled to said filter, and an integrator coupled to said detector and said correcting means.

4. Apparatus as claimed in claim 3, further comprising a comparator having a pair of inputs respectively coupled to said integrators, and output means providing an error signal to said correcting means.

5. Apparatus as claimed in claim 1, wherein said correcting means comprises a bimorph coupled to said detecting means and having said reproducing means mounted thereon.

6. Apparatus for use with a magnetic tape having luminance and chroma components of a television signal recorded in separate tracks and horizontal sync signals recorded in a track between said separate tracks, said apparatus comprising a bimorph, a pair of magnetic heads mounted on said bimorph to respectively reproduce said luminance and chrominance components, a pair of lowpass filters respectively coupled to said heads, a pair of detectors respectively coupled to said filters, and a pair of integrators respectively coupled to said detectors and coupled to said bimorph.

7. Apparatus as claimed in claim 6, further comprising a comparator having a pair of inputs respectively coupled to said integrators and an output for providing an error signal to said bimorph.

* * * * *